Sept. 22, 1942.　　　　R. V. BROST　　　　2,296,765
STEREOSCOPIC DISPLAY DEVICE
Filed Oct. 13, 1941　　　　2 Sheets-Sheet 1
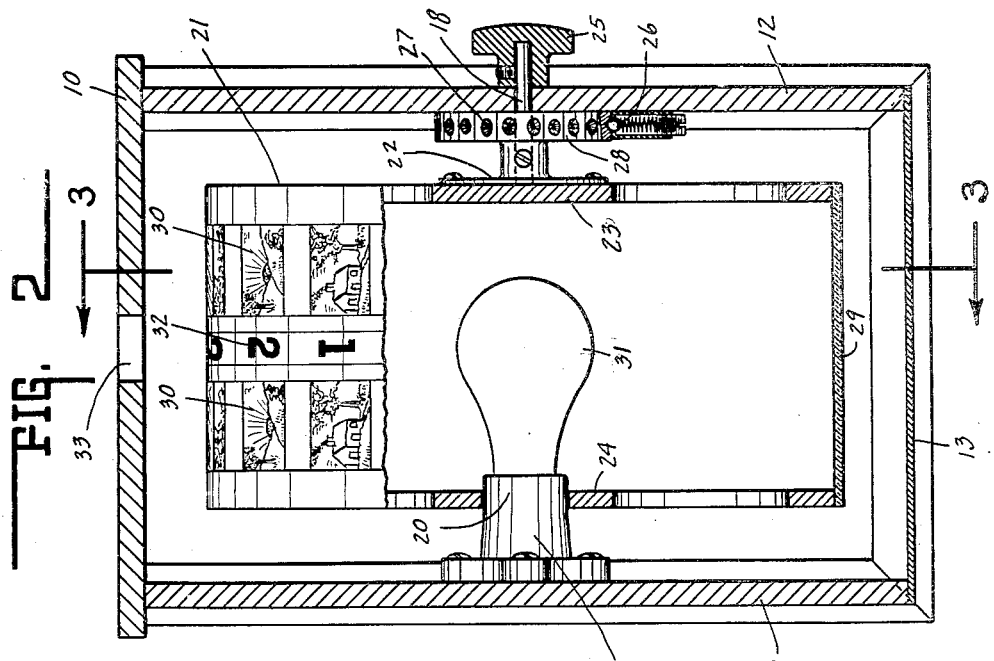
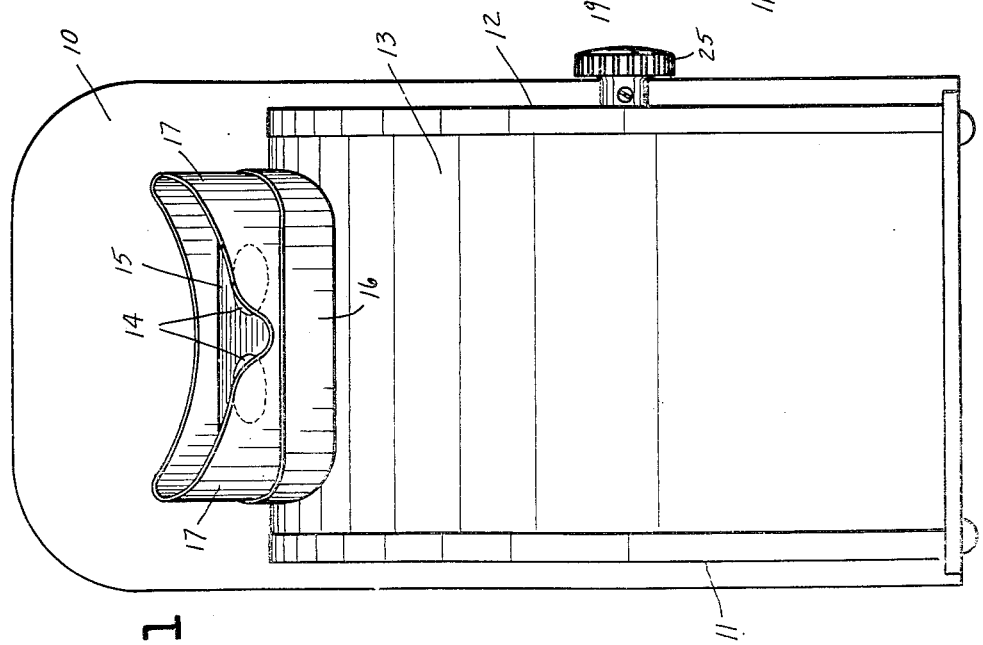
INVENTOR.
ROBERT V. BROST.
BY Lockwood, Goldsmith & Galt,
ATTORNEYS.

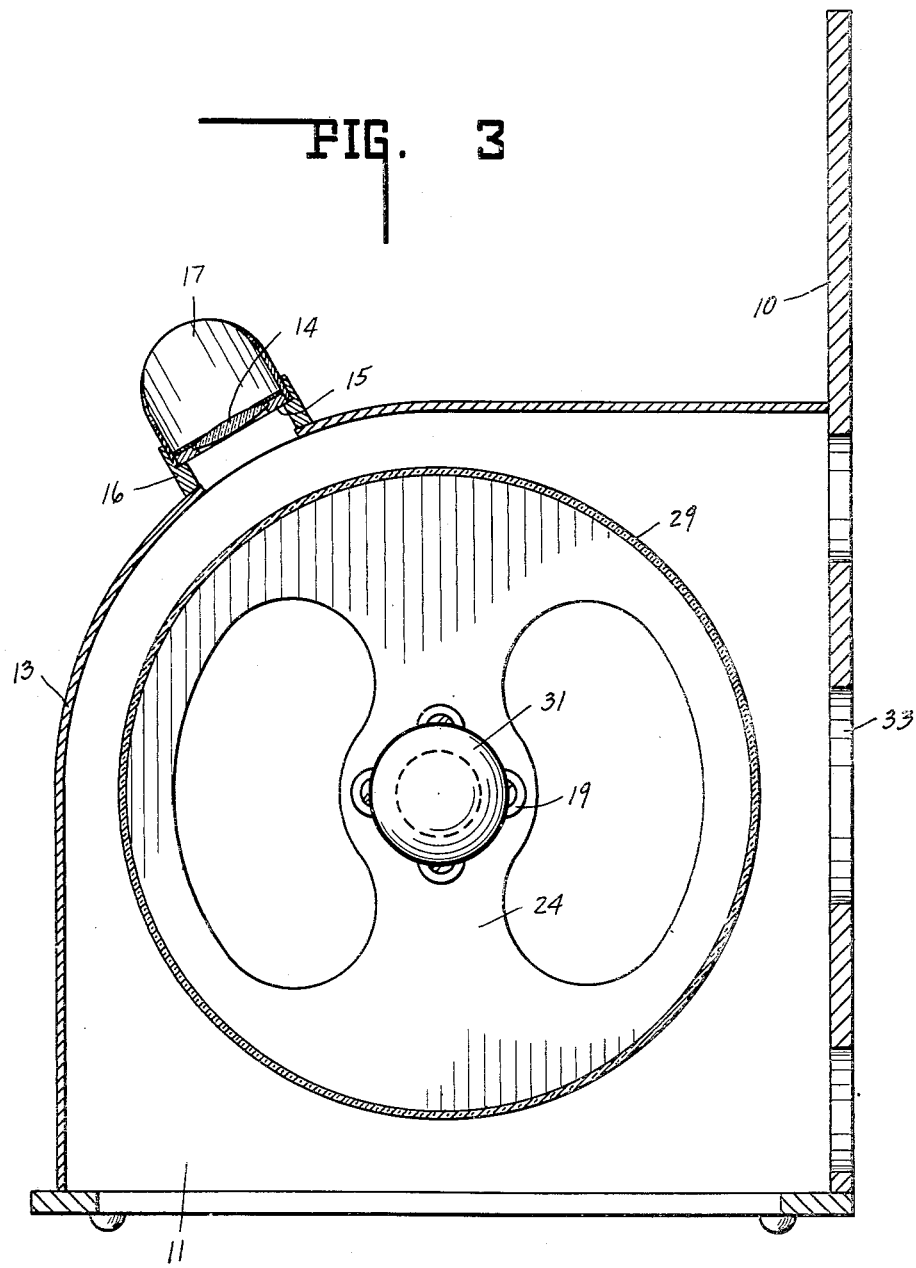

Patented Sept. 22, 1942

2,296,765

UNITED STATES PATENT OFFICE 2,296,765

STEREOSCOPIC DISPLAY DEVICE

Robert V. Brost, Chicago, Ill.

Application October 13, 1941, Serial No. 414,758

4 Claims. (Cl. 88—31)

This invention relates to a stereoscopic display device which is particularly adapted for advertising displays, for visual education and for selecting and training observers for stereoscopic range finding instruments for anti-aircraft artillery, and for other purposes as well.

One object of the invention is to provide a simple and convenient device by means of which a plurality of stereoscopic views may be rapidly shown to an observer. In the use of stereoscopic display devices, it has heretofore been necessary to perform considerable manual manipulation in the changing of the views or to provide relatively complicated and expensive apparatus for the purpose. The present invention makes it possible for the observer to change from one view to another without loss of time and without removing his eyes from the eye piece. At the same time, the construction by which this result is accomplished is simple and inexpensive.

Another object of the invention is to provide in an apparatus of this type index means to indicate to a second observer the title or subject of the view which is under observation at any time. This is particularly important in an advertising display in which stereoscopic views of merchandise are shown to a prospective customer. By the use of the index, a salesman is able to know at any time which of the views is under observation and may govern his sales talk accordingly.

Another object of the invention is to provide suitable and adequate illumination for the views under observation.

Other objects and features of the invention will be understood from the accompanying drawings and the following description and claims:

Fig. 1 is a front view of a display device constructed in accordance with a preferred form of the invention. Fig. 2 is a plan view with the outer casing shown in section and certain of the inner parts cut away. Fig. 3 is a vertical sectional view taken substantially on the line 3—3 of Fig. 2.

In the preferred form of the invention shown in the drawings by way of illustration, there is provided a casing consisting of a back wall 10, side walls 11 and 12 and a curved front wall 13. Said casing may be formed of any suitable material.

In a convenient position on the front wall 13 there is mounted an optical system consisting of a pair of lenses 14 mounted on a retainer 15 in turn mounted on a member 16 secured to the casing. The member 16 is formed with a light guard 17 and is properly shaped to conform to the contour of an observer's face when his eyes are placed at the lenses 14. Said lenses provide suitable magnification and are spaced at one average interpupilary distance.

Within the casing there is provided a stub shaft 18 journaled in the side wall 12. Directly opposite said shaft there is mounted a lamp socket 19 having a substantially cylindrical outer surface 20 which is arranged concentrically with the shaft 18. A drum-like rotor 21 is mounted on the shaft 18 by means of a fitting 22 attached to one of the heads 23 thereof. The opposite head 24 is provided with an opening fitting over the lamp socket 20 and rotatably journaled on said lamp socket. The shaft 18 is provided with a knob 25 accessible to the observer and used for turning the rotor 21 to successive positions. A spring pressed ball detent 26 is mounted on the inner surface of the wall 12 and engages depressions 27 in a plate 28 secured to the shaft 18. Said detent thus yieldingly holds the rotor in successive positions determined by the depressions 27.

The cylindrical wall 29 of the rotor 21 is formed of a translucent material, preferably a milky plastic adapted to transmit light with an even diffusion. On the outer surface of said cylindrical wall there are mounted a plurality of pairs of films 30, two of which are shown in Fig. 2. Each of said pairs of films carries a pair of stereoscopically mating images and the spacing of said images is such as to provide proper stereoscopic relation to the lenses 14 of the optical system. The pairs of pictures may be successively brought to proper observing position by turning the rotor by means of the knob 25. The depressions 27 may be so arranged as to cause each picture to be held in proper position.

The films 30 are preferably color films and are illuminated for observation by a lamp 31 in the lamp socket 19, said lamp being supplied with current from any suitable source.

The outer surface of the wall 29 of the rotor between and around the films 30 is preferably covered with opaque material to prevent diffusion of light which would obscure the visibility of the images on the film. The opaque material is preferably stencilled on the rotor before the films are attached and the stencilling provides indications for the proper positioning of the several films.

In the space between the films there may be placed a series of index numbers 32 or other indicia arranged to be observed through an opening 33 provided in the rear wall 10 of the device. These indicia may be in the form of numbers painted or printed on the rotor or may be in the form of openings in the opaque material stencilled thereon. If desired, the full title of each picture may be printed in place of index numbers. The index is arranged so that the indication appearing at the opening 33 corresponds to the film or image then in place beneath the lenses 14 of the optical system.

From the foregoing specification, it will be apparent that the operation of the device is extremely simple and rapid and that a large number of views may be shown to a given observer in a brief period of time. The stereoscopic pictures, especially in color, give extremely pleasing representation of merchandise which may not be available for actual inspection. Another advantage in the construction is the fact that no rewinding of a film is required. At the termination of one showing, the apparatus is immediately in condition to start another.

The invention has been described in one of its preferred forms, the details of which may be varied by those skilled in the art without departing from the scope of the invention as defined by the appended claims.

The invention claimed is:

1. A stereoscopic display device including a casing, a stereoscopic optical system mounted on said casing, a hollow cylindrical rotor in said casing, the cylindrical wall of said rotor being formed of translucent material, films mounted on said wall and carrying a plurality of pairs of stereoscopically mating images adapted to be brought successively into position to be viewed through said optical system by rotation of said rotor, illuminating means within said rotor, and an index carried by said rotor, said casing having an opening through which said index is visible, and said opening being placed in a wall of said casing remote from said optical system to be visible to one observer while another observer is using said optical system.

2. A stereoscopic display device including a casing, a stereoscopic optical system mounted on said casing, a hollow cylindrical rotor in said casing, the cylindrical wall of said rotor being formed of translucent material, films mounted on said wall and carrying a plurality of pairs of stereoscopically mating images adapted to be brought successively into position to be viewed through said optical system by rotation of said rotor, illuminating means within said rotor, manually operable means accessible from the exterior of said casing for turning said rotor to successive positions, and a detent adapted yieldingly to retain said rotor in each of said positions.

3. A stereoscopic display device including a casing, a stereoscopic optical system mounted on said casing, a lamp socket mounted on a side wall of said casing and having a substantially cylindrical outer surface, a shaft journaled in the opposite wall of said casing concentrically with said cylindrical surface, a hollow cylindrical rotor in said casing mounted on said shaft and journaled on said cylindrical surface, the outer wall of said rotor being formed of translucent material, films mounted on said wall and carrying a plurality of pairs of stereoscopically mating images adapted to be brought successively into position to be viewed through said optical system by rotation of said rotor, and a lamp carried by said lamp socket within said rotor.

4. A stereoscopic display device including a casing, a hollow cylindrical rotor in said casing, the cylindrical wall of said rotor being formed of translucent material, films mounted on said wall and carrying a plurality of pairs of stereoscopically mating images, the images of each pair being arranged side-by-side, a stereoscopic optical system mounted on said casing, directed toward the outer surface of said rotor and arranged for simultaneously viewing the two images of a pair, said rotor being movable to bring said pairs successively into position to be viewed, and illuminating means within said rotor.

ROBERT V. BROST.